July 20, 1926.
A. ANDERSON
SCREEN FOR AUTOMOBILES
Filed May 4, 1925
1,593,324
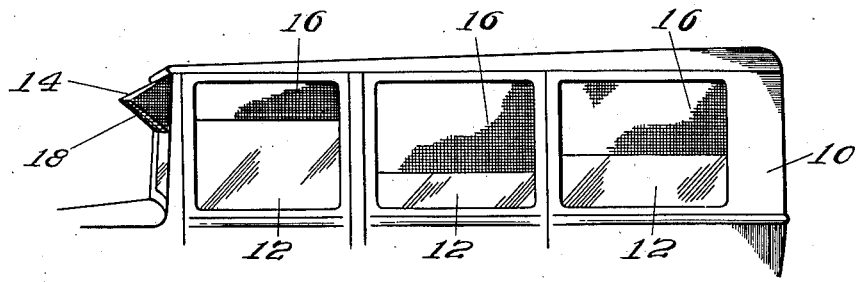
FIG. 1
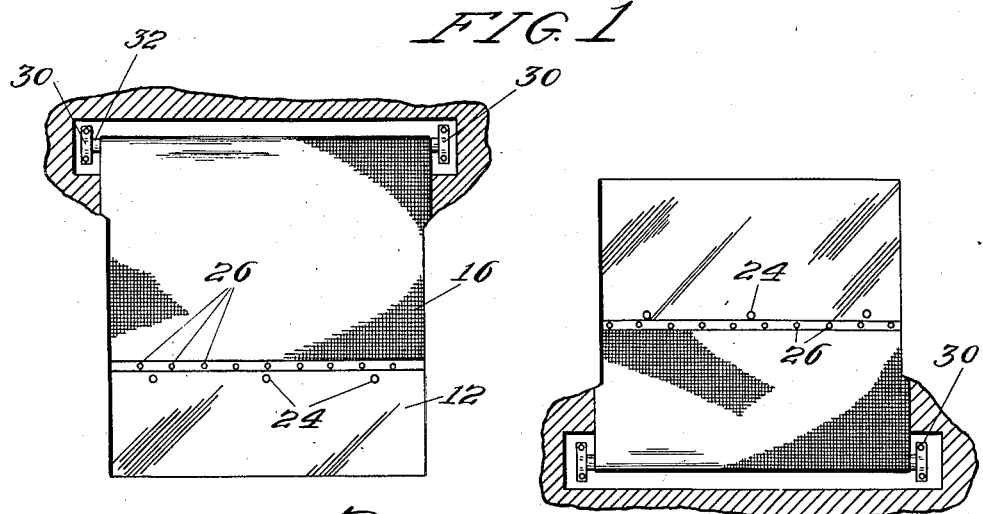
FIG. 2  FIG. 3
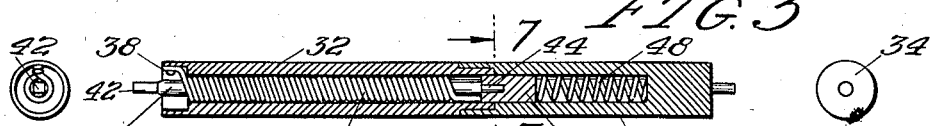
FIG. 5  FIG. 4  FIG. 6
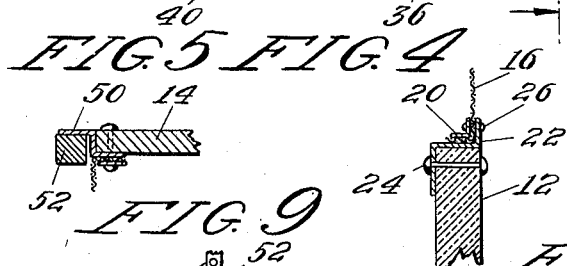
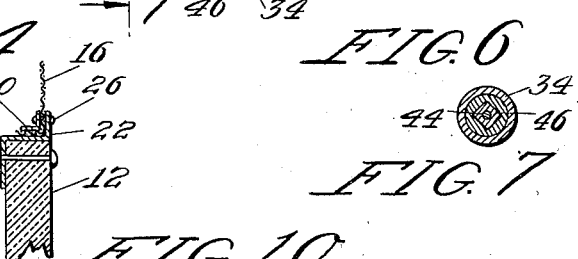
FIG. 9  FIG. 10  FIG. 7
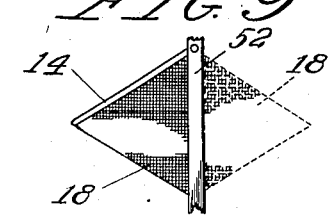
FIG. 8
ANDREW ANDERSON
INVENTOR
PER *Albert J. Fike*
ATTORNEY Patented July 20, 1926.

1,593,324

UNITED STATES PATENT OFFICE.

ANDREW ANDERSON, OF ROCKFORD, ILLINOIS, ASSIGNOR TO JOSEPH S. LUNDHOLM AND ERNST PETERSON, BOTH OF ROCKFORD, ILLINOIS.

SCREEN FOR AUTOMOBILES.

Application filed May 4, 1925. Serial No. 27,640.

This invention relates to improvements in automobile enclosures, and has for one of its principal objects the provision of screening means for the window openings and windshields of automobiles, especially of the sedan type, in order to protect the occupants from insects, dust, and the like, whenever it is found necessary to open the windows of the car.

One of the important objects of this invention is to provide, in an automobile or the like, novel means for fitting a rolling or flexible screen to the windows of the automobile with a view to automatically screening the window as the same is opened and in accordance with the extent of the opening.

Still another important object of this invention is to provide, in an automobile screen or the like, means for enclosing the windshield with a permanent screen which at the same time shall render an adjustment and opening of the windshield convenient and feasible without interfering with the vision of the driver in any way.

Other and further important objects of the invention will be apparent from the disclosures in the accompanying drawings and following specification.

The invention, in a preferred form, is illustrated in the drawings and hereinafter more fully described.

In the drawings:

Figure 1 is a side elevation of a sedan top for an automobile or the like, showing the improved screening enclosure of this invention applied thereto.

Figure 2 is a detail view showing the application of the flexible screen to one of the side windows, parts being broken away.

Figure 3 is a similar view showing the application to a rear window.

Figure 4 is a sectional view illustrating the construction of the roller to which the screen is applied.

Figure 5 is a left hand end view of the roller shown in Figure 4.

Figure 6 is a right hand end view of the roller shown in Figure 4.

Figure 7 is a sectional view taken on the line 7—7 of Figure 4.

Figure 8 is a detail view illustrating the construction and operation of the windshield screen.

Figure 9 is a detail view showing the closed position of the windshield with the screen.

Figure 10 is a detail view illustrating the application of the screen to the edge of the pane.

As shown in the drawings:

The reference numeral 10 indicates generally an automobile top or the like, having therein the usual side windows 12 and windshield 14.

To each of the windows 12 is applied a screen 16 in the nature of a flexible metal mesh, and to the windshield 14 is applied a corresponding screen element in the nature of a housing 18 formed in similar wire mesh.

As best illustrated in Figures 2 and 10, the screen 16 is applied to the glass pane 12 by a pair of suitable angle irons 20 and 22, the last of which is affixed to the upper edge of the pane 12 by means of a series of rivets or the like 24. A corresponding series of rivets 26 passes through the angle irons 20 and 22, joining the same together and clamping the screen element 16 therebetween, as best illustrated in Figure 10.

The screen 16 itself is rolled upon a suitable roller, mounted in bearings 30, the whole being enclosed in a housing formed in the upper edge of the door or window sash. A similar construction is applied to the rear window as shown in Figure 3, the same being simply reversed as this window is raised for opening purposes instead of being lowered.

The roller itself is formed of two co-operating cylindrical elements 32 and 34, respectively, the element 32 having mounted therein a helical spring 36 having one end affixed at the outer edge as shown at 38. The other end of this spring is attached to a spindle or pin 40 having its outer end squared as illustrated at 42 for suitable cooperation with the bearing 30.

The other end of this rod or spindle 40 is cylindrical, as shown at 44, and is mounted in a square plug or the like 46 slidable in the members 22 and 34, and situated at approximately the junction as shown in Figure 4. The plug 46 is maintained in desired position by means of a helical spring 48. In this way the roller 32—34 is automatically adjustable to varying widths of bearings 30, and positive operation thereof is assured under such varying circumstances.

As shown in Figures 8 and 9, the windshield 14 of the automobile has attached thereto at its lower edge and at the sides a screen housing 18, the method of attachment being illustrated in Figure 9 and similar to that previously described. The position of the housing when the windshield is closed is shown in the dotted lines 18' in Figure 8. As shown in Figure 9, the angle plate 50 acts as a stop to co-operate with the supporting post 52 of the windshield frame to prevent undue inward movement of the windshield.

It will be evident that herein is provided an improved screening device for automobile windows, which shall be at all times in operative position and adapted to effectively screen the windows and windshield whenever the same are opened. Further, a novel form of automatically adjustable roller is provided for the screen upon which the screen is wound when the windows are closed, the construction of the roller adapting it to considerable variations in width between the bearings therefor.

I am aware that many changes may be made and numerous details of construction varied throughout a wide range without departing from the principles of this invention, and I therefore do not purpose limiting the patent granted hereon otherwise than as necessitated by the prior art.

I claim as my invention:

The combination of an automobile window and a screen therefor, said screen comprising a flexible wire mesh and a spring controlled roller for automatically taking up the screen upon closing of the said window, said roller comprising two opposed cylindrical co-operating elements, a helical binding spring in one of said elements, a spindle enclosed by said spring, one end of said spindle adapted to be mounted in the bearing for the roller, and a plug in which the other end of said spindle is rotatably mounted, said plug being of square cross section and slidably mounted in the end of the opposed portion of the roller, and resilient means for maintaining said plug in co-operative relation with the spindle and further maintaining the co-ordinated cylindrical roller elements in operative position with respect to the supporting bearings.

In testimony whereof I affix my signature.

ANDREW ANDERSON.